Aug. 5, 1958  H. W. KELLEHER  2,845,846
MIRROR AND SUPPORT MEANS
Filed Sept. 16, 1957  2 Sheets-Sheet 1
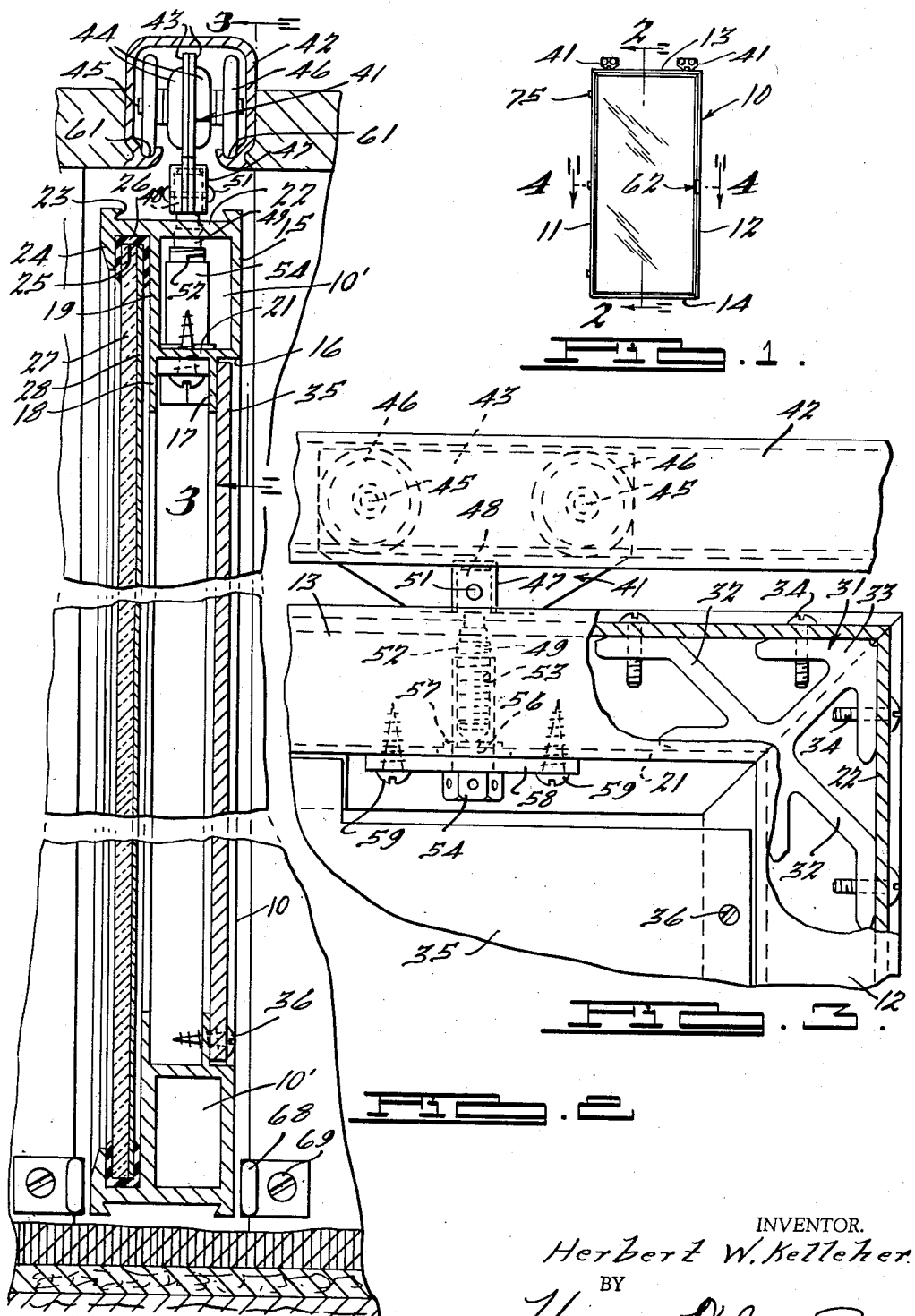
INVENTOR.
Herbert W. Kelleher
BY
Harness, Dickey & Pierce
ATTORNEYS Aug. 5, 1958 H. W. KELLEHER 2,845,846
MIRROR AND SUPPORT MEANS
Filed Sept. 16, 1957 2 Sheets-Sheet 2
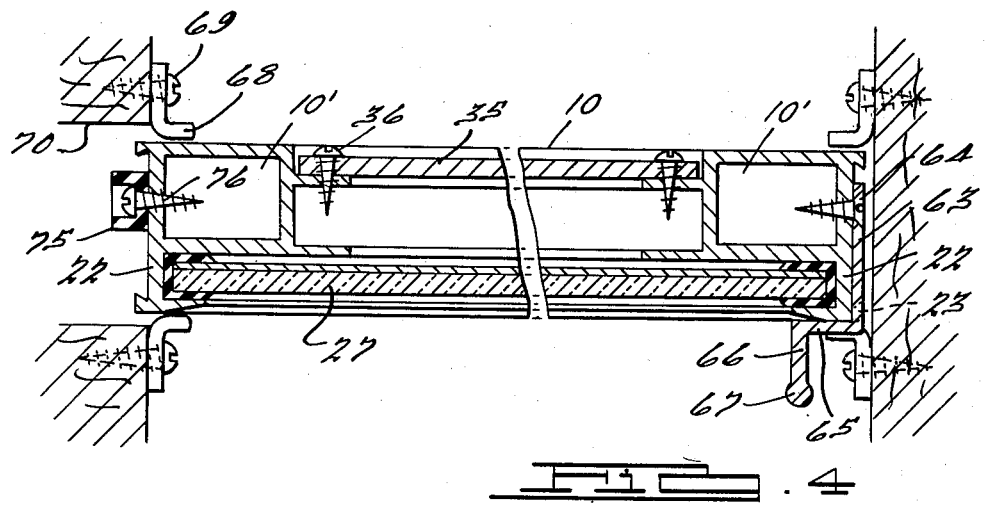
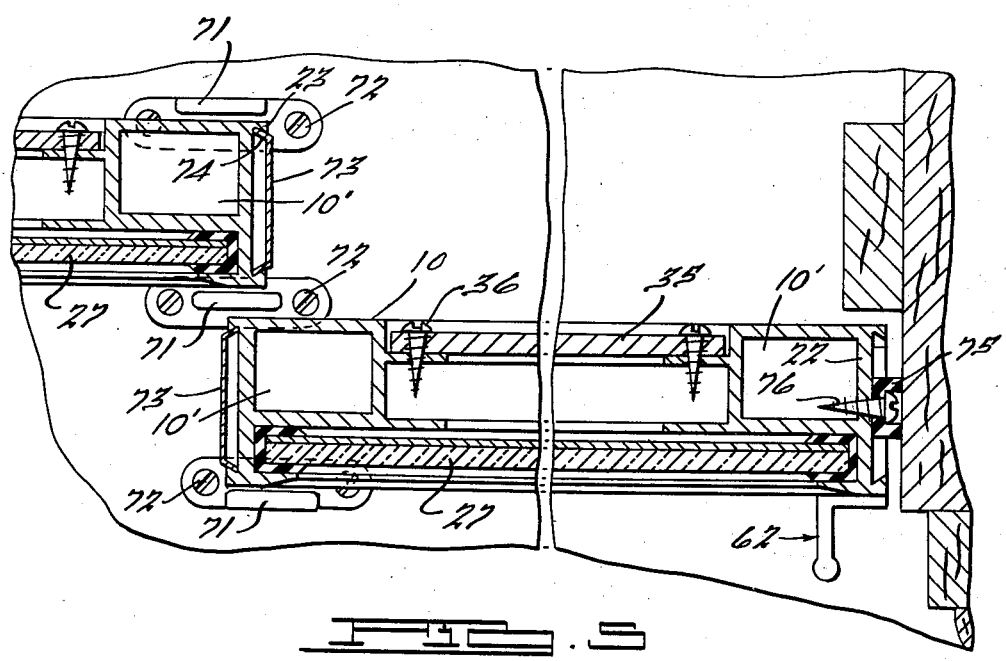
INVENTOR.
Herbert W. Kelleher
BY
Harness, Dickey & Pierce
ATTORNEYS 2,845,846

MIRROR AND SUPPORT MEANS

Herbert W. Kelleher, Grosse Pointe Park, Mich., assignor to Bailey-Kelleher Co., Detroit, Mich., a corporation of Michigan Application September 16, 1957, Serial No. 684,303

7 Claims. (Cl. 88—100)

This invention relates to supports for mirrors and particularly to a support having only a thin flange visible about the mirror edge.

The mirror is supported on a heavy frame which may be suspended on rollers which operate in a track for closing a door opening. The mirror and frame may be moved into a slot communicating with the jamb along one edge of the door opening or be moved in overlapping relation to a second mirror and frame occupying one half of the door opening.

A heavy frame structure employed to provide sufficient strength for supporting the mirror has a front flange of narrow width which encompasses the edge of the mirror to thereby leave substantially all of the face exposed. The heavy supporting section in back of the mirror may be secured directly to a wall or may be supported on rollers so as to function as a door to close an opening.

Accordingly, the main objects of the invention are: to support a mirror on a ledge having a narrow flange encompassing the mirror edge which is supported on a heavy frame disposed at the back of the mirror; to provide a narrow flange forwardly of a heavy frame which extends over the edge of the mirror to form a support and a neat trim edge therefor; to secure a supporting carriage at the top corners of the heavy frame portion back of the mirror and having rollers thereon which operate in arcuate trackways above a door frame for permitting the mirror supported by the frame to be moved across the door opening, and, in general, to provide a support for a mirror which is simple in construction, which is readily assembled and which is economical of manufacture.

Other objects and features of novelty of the invention will be specifically pointed out or will become apparent when referring, for a better understanding of the invention, to the following description taken in conjunction with the accompanying drawings, wherein:

Figure 1 is a view in elevation of a mirror mounted on a frame in a manner embodying features of the present invention;

Fig. 2 is a broken sectional view of the structure illustrated in Fig. 1, taken on the line 2—2 thereof;

Fig. 3 is a broken sectional view of the structure illustrated in Fig. 2, taken on the line 3—3 thereof;

Fig. 4 is an enlarged sectional view of the structure illustrated in Fig. 1, taken on the line 4—4 thereof, and Fig. 5 is a view of structure, similar to that illustrated in Fig. 4, showing another form which the invention may assume.

A frame of substantial size and strength is employed for supporting a mirror in fixed position on a wall or on rollers so that it may be used to close a door opening. The mirror is large and heavy when employed as a sliding door for an opening as it must be at least six feet in height. Since it is the object of the invention to have as small a portion of the frame visible at the front of the assembly as possible, the frame portion back of the mirror is of substantial area and strength. The frame 10 is made of lengths of an extruded hollow section strip 10', a left-hand length 11, a right-hand length 12, an upper length 13, and a lower length 14. The shape of the extruded hollow section strip 10' is illustrated in Fig. 2 as having a rear web 15 which is offset at 16 to form a rabbet from which a flange 17 extends. This flange is parallel to an extending section 18 of a front web 19, the webs 15 and 19 being spaced apart at the inner side by a web 21 in extension of the offset portion forming the rabbet 16. A heavier outer web 22 forms the outside face of the strip from which spaced projections 23 extend forming a dovetailed recess for a purpose to be explained hereinafter. The web 22 extends forwardly of the web 19 and is provided with a flange portion or L-shaped extension 24 which forms with the web 19 a channel 25 for receiving the resilient channel strip 26 and the edge of the mirror 27. The mirror has the usual back coating 28 thereon to protect the silver face on the rear of the mirror.

The four sections have 45° mitered corners as illustrated in Fig. 3 which are secured together by sections 31 of an extruded strip. The section 31 has two C-shaped branches 32 which extend within the rectangular opening of the frame lengths with an arrow-like portion 33 extending therefrom which engages the outside web portion 22 which is secured to the section 31 by a plurality of screws 34. Three of the lengths 11, 12, 13 and 14 are secured together to form a C-shaped channel portion 25 in which the resilient channel strip 26 is placed along with the edge of the mirror 27 which is encompassed thereby. The mirror and channel strip are slid into position, and the fourth length is then attached to the connected three lengths to complete the assembly. Thereafter a sheet of material 35 of plywood, resin fabricated material or the like is placed within the rabbeted portion 16 on the rear side of the assembled frame and secured in position by a plurality of screws 36 which extend into the inwardly projecting flange 17. The mirror thus supported may be secured in position on a wall by suitable hangers, not herein illustrated, or may be supported on rollers which operate in a U-sectioned track element and may be movable to different positions as for closing a door opening or the like.

In Figs. 1, 2 and 3 a pair of supporting carriages 41 are secured to the top length 13 for supporting the frame and mirror on an inverted U-section track element 42 for movement to and from a door opening. The supporting carriage 41 embodies a pair of stampings 43 having embossed portions 44 near opposite ends for supporting shafts 45 on which pairs of wheels 46 are secured. The stampings have semicylindrical embossed portions 47 at the bottom for receiving the cylindrical end 48 of a supporting stud 49 to which it is secured by a rivet 51. The stud 49 has a thread 52 thereon which is screwed within the internal thread 53 of a bolt 54. The head of the bolt may have a plurality of apertures 55 therethrough so that rotatable adjustment may be made by a nail, nail set or the like. Adjacent to the head the bolt has an annular slot 56 therein in which a U-shaped washer 57 is secured for retaining the bolt 54 on a securing plate 58 which is fastened to the web 21 by screws 59. By turning the bolt 54 the right or left corner of the mirror is raised or lowered to thereby adjust the mirror to the door frame.

The U-sectioned track element 42 is of inverted channel section, as pointed out hereinabove, having arcuate trackways 61 at the lower inner edges to receive the arcuate edge of the wheels 46 which roll therealong. The wheels may be made of low friction resin material such as nylon, Orlon or the like which eliminates noise and permits the movement of the wheels on the shafts 45 and the ways 61 with little friction or noise. A handle 62 is secured along one edge of the door, as illustrated in Fig. 1, on the frame length 11. The handle has a web portion 63 which is secured by a pair of screws 64 to the web 22 of the frame length 11. The dovetail portion 23 is removed for the length of the handle so that the web portion 63 will abut the web 22. An extending web 65 on the mirror edge of the web 63 supports a web 66 having a cylindrical outer section 67 which may be grasped by the fingers of the hand to slide the door on the rail.

In the structure illustrated in Fig. 4 the mirror and frame function as a door and are movable within a slot 70 in the left-hand wall as viewed in the figure. As illustrated in Figs. 2 and 4, angle elements 68 which are preferably made of plastic material are secured by screws 69 on each side of the mirror and frame assembly on the opposite jamb faces for guiding the bottom portion of the door and preventing it from swinging laterally of its direction of movement. To further prevent the door from swinging, it will be noted that the bolt 54 is moved to the left of the center between the webs 15 and 19 to more nearly balance the weight of the mirror 27 which is on the left-hand face of the frame, as illustrated in Fig. 2.

In Fig. 5 a door opening is illustrated in which a pair of the mirrored doors 10 are supported for movement in overlapping relation to each other. Centrally of the opposite jambs upwardly presenting guide members 71 are employed, secured to the floor by screws 72 for guiding the central portion of the doors 10 and preventing them from swinging toward or away from each other. The adjacent ends of the door frame have a U-shaped extrusion strip 73 snapped therein to provide a trim for the edge. The projecting edges 74 are sprung beneath the dovetail edges 23 and are thereby locked in secured relationship. The opposite ends of the doors are provided with a plurality of bumpers 75 of resilient material secured to the web 22 by screws 76.

It will thus be seen that supporting structure has been provided for a large, heavy mirror which has the portion which provides the strength located back of the mirror and only a slight amount of material which supports the mirror visible about the edge thereof. The frame is made from lengths of an extruded hollow section strip which have mitered corners secured together to form the rectangular frame. Suitable hanging brackets may be employed for securing the frame to the wall when the mirror is to be supported in fixed position. Key slots may be provided in the web 15 of the top length 13 through which screws projecting from a wall may extend. When the mirror is to be movable for closing a door opening, supporting carriages 41 are mounted on the opposite ends of the top length 13 having wheels thereon which operate on tracks in an inverted U-sectioned track element. The connecting portions of the supporting carriages 41 are adjustable to support the frame and mirror in accurate vertical position at a desired height from the floor. A handle may be provided on one edge of the door and bumpers may be employed on the door edges for preventing the frame from striking the faces of the jamb when the door is moved to closed position. Guide elements are employed adjacent to the floor for the purpose of preventing the swinging of the mirror on the arcuate trackways, the supporting carriages 41 being offset toward the mirror to more nearly balance the weight of the mirror and frame when supported thereby.

What is claimed:

1. A mirror frame combination including a mirror panel and a supporting frame means, said frame means embodying a plurality of frame lengths, said frame lengths extending entirely around the mirror panel, each frame length comprising a hollow rectangular main section having top, side, and bottom faces; said main section having a web extending outwardly from the front face substantially in alignment with the top face thereof, the outer edge of said web having a flange extending downwardly from and substantially parallel to, spaced from, and shorter than said front face and forming a channel therewith, and a mirror panel supported in said channel and engaging substantially all of said front face which is hidden from view thereby, said main rectangular hollow section at the rear of the mirror panel supplying the strength for supporting the mirror panel augmented by that of the web and flange extension thereof which forms a narrow margin for the mirror panel edge.

2. A mirror frame combination including a mirror panel and a supporting frame means, said frame means embodying a plurality of frame lengths, said frame lengths extending entirely around the mirror panel, each frame length comprising a hollow rectangular main section having top, side, and bottom faces; said main section having a web extending outwardly from the front face substantially in alignment with the top face thereof, the outer edge of said web having a flange extending downwardly from and substantially parallel to, spaced from, and shorter than said front face and forming a channel therewith, a mirror panel supported in said channel and engaging substantially all of said front face which is hidden from view thereby, said main rectangular hollow section at the rear of the mirror panel supplying the strength for supporting the mirror panel augmented by that of the web and flange extension thereof which forms a narrow margin for the mirror panel edge, and a pair of parallel flanges depending from the bottom side of said main section and normal thereto.

3. A mirror frame combination including a mirror panel and a supporting frame means, said frame means embodying a plurality of frame lengths, said frame lengths extending entirely around the mirror panel, each frame length comprising a hollow rectangular main section having top, side, and bottom faces; said main section having a web extending outwardly from the front face substantially in alignment with the top face thereof, the outer edge of said web having a flange extending downwardly from and substantially parallel to, spaced from, and shorter than said front face and forming a channel therewith, a mirror panel supported in said channel and engaging substantially all of said front face which is hidden from view thereby, said main rectangular hollow section at the rear of the mirror panel supplying the strength for supporting the mirror panel augmented by that of the web and flange extension thereof which forms a narrow margin for the mirror panel edge, a pair of parallel flanges depending from the bottom side of said main section and normal thereto, and a closure panel retained against at least one of said flanges to enclose the rear side of the mirror panel in the frame and provide additional strength thereto.

4. A mirror frame combination including a mirror panel and a supporting frame means, said frame means embodying a plurality of frame lengths, said frame lengths extending entirely around the mirror panel, each frame length comprising a hollow rectangular main section having top, side, and bottom faces; said main section having a web extending outwardly from the front face substantially in alignment with the top face thereof, the outer edge of said web having a flange extending downwardly from and substantially parallel to, spaced from, and shorter than said front face and forming a channel therewith, a mirror panel supported in said channel and engaging substantially all of said front face which is hidden from view thereby, said main rectangular hollow section at the rear of the mirror panel supplying the strength for supporting the mirror panel augmented by that of the web and flange extension thereof which forms a narrow margin for the mirror panel edge, and supporting carriages mounted on the top side of the frame by adjustable connector means which extend through the main hollow section of the frame, said connector means embodying an internally threaded sleeve and a stud threaded thereinto and having a head engaging the bottom side of the main section.

5. A mirror frame combination including a mirror panel and a supporting frame means, said frame means embodying a plurality of frame lengths, said frame lengths extending entirely around the mirror panel, each frame length comprising a hollow rectangular main section having top, side, and bottom faces; said main section having a web extending outwardly from the front face substantially in alignment with the top face thereof, the outer edge of said web having a flange extending downwardly from and substantially parallel to, spaced from, and shorter than said front face and forming a channel therewith, a mirror panel supported in said channel and engaging substantially all of said front face which is hidden from view thereby, said main rectangular hollow section at the rear of the mirror panel supplying the strength for supporting the mirror panel augmented by that of the web and flange extension thereof which forms a narrow margin for the mirror panel edge, and supporting carriages mounted on the top side of the frame by adjustable connector means which extend through the main hollow section of the frame, said connector means embodying an internally threaded sleeve and a stud threaded therein and having a head engaging the bottom side of the main section, and said connector being offset from the center of the main hollow section in a direction toward the mirror panel to effect a better balance of the assembly.

6. A mirror frame combination including a mirror panel and a supporting frame means, said frame means embodying a plurality of frame lengths, said frame lengths extending entirely around the mirror panel, each frame length comprising a hollow rectangular main section having top, side, and bottom faces; said main section having a web extending outwardly from the front face substantially in alignment with the top face thereof, the outer edge of said web having a flange extending downwardly from the substantially parallel to, spaced from, and shorter than said front face and forming a channel therewith, a mirror panel supported in said channel and engaging substantially all of said front face which is hidden from view thereby, said main rectangular hollow section at the rear of the mirror panel supplying the strength for supporting the mirror panel augmented by that of the web and flange extension thereof which forms a narrow margin for the mirror panel edge, and adjustable supporting means for the said frame secured to the top side thereof and offset from the center of the main hollow section thereof in a direction toward the mirror panel to effect a better balance of the assembly.

7. A mirror frame combination including a mirror panel and a supporting frame means, said frame means embodying a plurality of frame lengths, said frame lengths extending entirely around the mirror panel, each frame length comprising a hollow rectangular main section having top, side, and bottom faces; said main section having a web extending outwardly from the front face substantially in alignment with the top face thereof, the outer edge of said web having a flange extending downwardly from and substantially parallel to, spaced from, and shorter than said front face and forming a channel therewith, a mirror panel supported in said channel and engaging substantially all of said front face which is hidden from view thereby, said main rectangular hollow section at the rear of the mirror panel supplying the strength for supporting the mirror panel augmented by that of the web and flange extension thereof which forms a narrow margin for the mirror panel edge, and supporting carriages mounted on the top side of the frame by adjustable connector means which extend through the main hollow section of the frame, said connector means embodying an internally threaded sleeve and a stud threaded thereinto and having a head engaging the bottom side of the main section, said panel being cut away along the top edge to expose the head to have it accessible for adjustment.

References Cited in the file of this patent
UNITED STATES PATENTS

| | | |
|---|---|---|
| 165,386 | Tracy | July 6, 1875 |
| 1,638,509 | Pick | Aug. 9, 1927 |
| 1,707,013 | Hoegger | Mar. 26, 1929 |
| 1,750,366 | Smith | Mar. 11, 1930 |
| 1,891,740 | Westerman | Dec. 20, 1932 |
| 1,956,173 | Katzman et al. | Apr. 24, 1934 |
| 1,980,990 | Gronbeck | Nov. 20, 1934 |
| 2,150,675 | Edwards | Mar. 14, 1939 |
| 2,170,870 | Nichols | Aug. 29, 1939 |
| 2,254,190 | Ricken | Aug. 26, 1941 |
| 2,578,096 | Smith | Dec. 11, 1951 |
| 2,627,092 | Grossman | Feb. 3, 1953 |
| 2,680,269 | Watkins | June 8, 1954 |
| 2,732,919 | Johnson | Jan. 31, 1956 |